United States Patent [19]
Clarke, Jr.

[11] Patent Number: 5,815,980
[45] Date of Patent: Oct. 6, 1998

[54] MOSQUITO LARVAE LIGHT TRAP

[75] Inventor: John L. Clarke, Jr., Riverside, Ill.

[73] Assignee: Clarke Mosquito Control Products, Inc., Roselle, Ill.

[21] Appl. No.: 740,433

[22] Filed: Oct. 29, 1996

[51] Int. Cl.⁶ .............................. A01K 5/00; A01M 1/04
[52] U.S. Cl. .............................................. 43/113; 43/17.5
[58] Field of Search .............................. 43/113, 17.5, 41, 43/54.1, 55, 4

[56] References Cited

U.S. PATENT DOCUMENTS

| | | | |
|---|---|---|---|
| 3,464,139 | 9/1969 | Eggers | 43/17.5 |
| 3,510,978 | 5/1970 | Murdock | 43/17.5 |
| 3,939,802 | 2/1976 | Neff | 43/113 |
| 4,020,580 | 5/1977 | Chappell | 43/17.5 |
| 4,553,194 | 11/1985 | Bailey | 43/17.5 |
| 5,184,414 | 2/1993 | Downs | 43/17.5 |
| 5,251,113 | 10/1993 | Wagoner | 43/17.5 |

Primary Examiner—Kurt Rowan
Attorney, Agent, or Firm—Dorn, McEachran, Jambor & Keating

[57] ABSTRACT

A device for the control of mosquito larvae includes a float and a self-contained electrical power source positioned on or within the float. There is a light source extending downwardly from the float and connected to the power source for activation thereof. A walled enclosure depends from the float, which enclosure will be filled with water when the float is placed upon the surface of a body of water. There is a generally 360° circumferential opening generally intermediate the ends of the enclosure which permits the passage of mosquito larvae into the enclosure when attracted by the light source. The opening is located generally adjacent the light source and mosquito larvae attracted by light from the source will swim into the enclosure and then upwardly seeking air and will shortly thereafter expire due to the lack of air within the enclosure.

8 Claims, 1 Drawing Sheet

U.S. Patent    Oct. 6, 1998    5,815,980
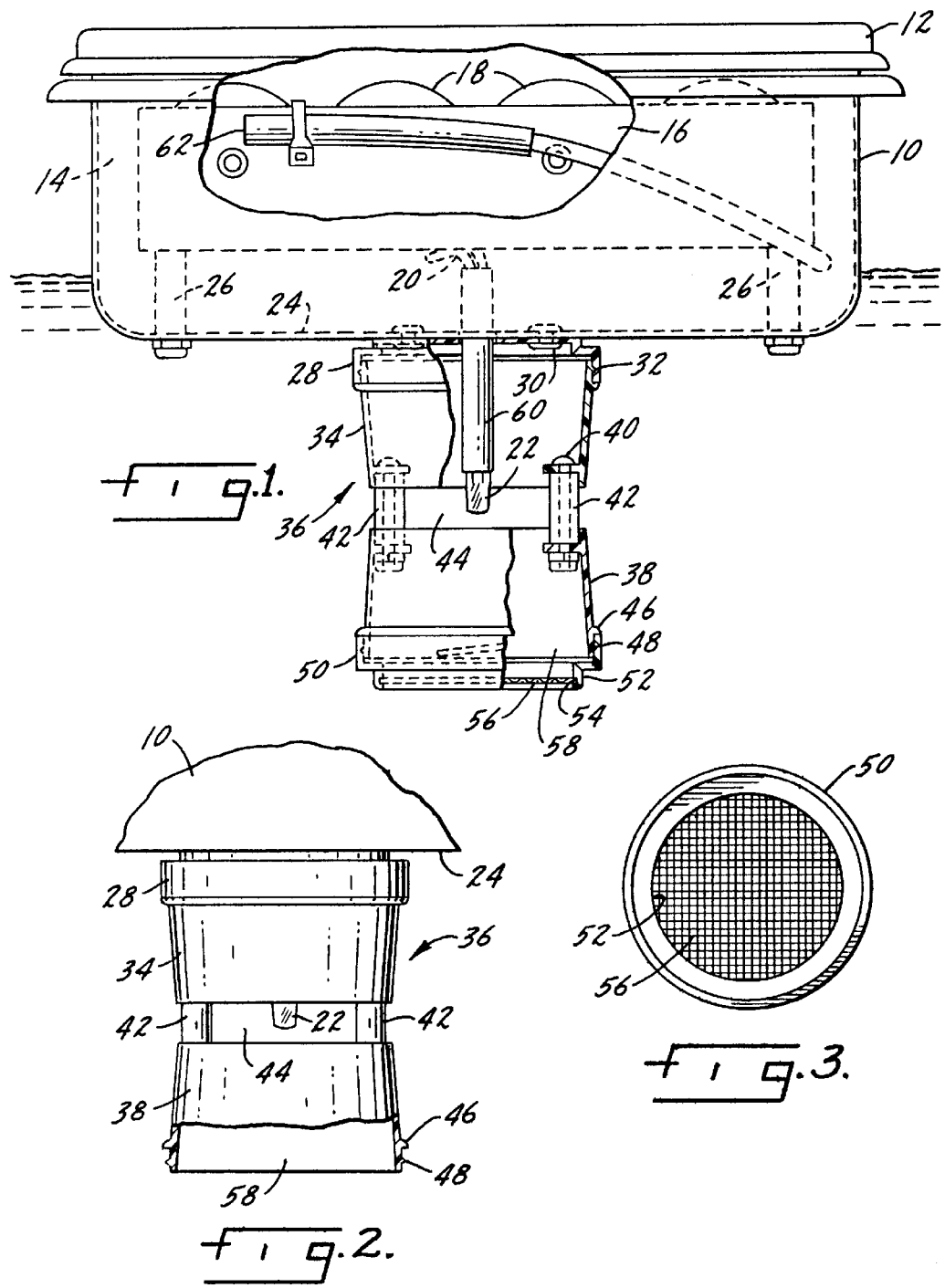

MOSQUITO LARVAE LIGHT TRAP

THE FIELD OF THE INVENTION

There are two principal methods for the control of mosquitoes. One method seeks to destroy the mosquito itself, commonly by spraying. Such a process is not always favored in some areas due to the perceived environmental problems associated with the spraying of insecticides. A more acceptable procedure is to destroy mosquito larvae. This can be done by the distribution of an insecticide in pellet or briquet form in swampy areas or within a body of water.

The present invention is directed to the control and destruction of mosquito larvae by providing a light trap which floats upon the surface of a body of water in which mosquito larvae may be present. The larvae are attracted to light as they believe it represents the surface of the body of water and larvae must periodically have access to air in order to sustain life. The light trap of the present invention utilizes a light emitting diode as a light source, with the light emitting diode extending downwardly from a floating container which has a self-contained power source such as batteries. There is a walled enclosure depending downwardly from the float and a 360° opening within the walled enclosure generally in alignment with the light source. The mosquito larvae are attracted by the light, will swim upwardly within the enclosure and will shortly expire as there is no air within the enclosure.

The invention may not only be used for the control or elimination of mosquito larvae, but may also be used as a means for determining the larvae population in a particular body of water. The lower end of the enclosure into which the mosquito larvae swim may be either open, in which case the dead larvae will fall down into the bottom of the body of water and become part of the food chain, or there may be a cover, either closed or as a screen at the bottom of the enclosure, which will collect the mosquito larvae which have been destroyed.

SUMMARY OF THE INVENTION

The present invention relates to a device for controlling mosquito larvae and more specifically to what is termed a light trap for attracting and destroying mosquito larvae.

A primary purpose of the invention is a simply constructed, reliably operable light trap for the elimination of mosquito larvae in a body of water.

Another purpose is a light trap as described which utilizes a light emitting diode positioned generally in alignment with a 360° opening into the enclosure depending downwardly from a floating power source.

Another purpose is a mosquito larvae light trap as described which may be used either as a means for controlling larvae, by the elimination thereof, or as a means for collecting larvae which have been destroyed to determine the population of such within a body of water.

Other purposes will appear in the ensuing specification, drawings and claims.

BRIEF DESCRIPTION OF THE DRAWINGS

The invention is illustrated diagrammatically in the following drawings wherein:

FIG. 1 is a side view, in part section, of the mosquito larvae control device of the present invention, FIG. 2 is a side view of the walled enclosure illustrated in FIG. 1, but with the bottom of the enclosure open, and FIG. 3 is a plan view of the screen which may be used to close the bottom of the light trap enclosure.

DESCRIPTION OF THE PREFERRED EMBODIMENT

The use of light traps for the attraction and subsequent destruction of mosquito larvae have been described in the following articles: "An Aquatic Light Trap for Possible Use in Mosquito Larvae Surveillance," by R. G. Weber, published in Proceedings of Seventy-Second Annual Meeting of the New Jersey Mosquito Control Association, Inc.; "A Novel Light Source and Small Subaquatic Light Trap for Sampling Culex Larvae," by R. G. Weber, published in Proceedings of Seventy-Sixth Annual Meeting of the New Jersey Mosquito Control Association, Inc.; "An Underwater Light Trap for Collecting Bottom-Dwelling Aquatic Insects," by R. G. Weber, published in the November & December, 1987 issue of Entomological News; "Selecting and Maintaining Batteries for Portable Light Traps," by R. G. Weber, published in Proceedings of Seventy-Fifth Annual Meeting of the New Jersey Mosquito Control Association, Inc.; "Response of Larval Culex Pipiens (Diptera: Culicidae) to Light Produced by Light Emitting Diodes," by R. G. Weber, published in the May & June, 1989 issue of Entomological News.

In the published articles, the enclosure floats horizontally on its side and only emits light in one direction. The mosquito larvae accumulate, block the opening, and in essence turn the trap off. This type of device has the clear disadvantage of restricting the entrance of mosquito larvae and not providing sufficient access to the interior of the enclosure to those larvae attracted by the light. The present invention overcomes the problems associated with the prior art light traps in that it provides essentially 360° access to the interior of the enclosure by locating the light source generally in alignment with such a circumferential opening. Further, the present invention can be used alternately as either a control device or as a collection device.

In FIG. 1, a flotation device is indicated at 10 and may be a plastic container with a lid 12 and a hollow interior chamber 14. Positioned within the chamber 14 is a battery assembly 16 having a plurality, for example four, 1.5 volt batteries indicated at 18. The batteries are connected in series and the electrical circuit may include a resistance, as typically the light emitting diode used herein requires 2.8 volts. The batteries 18 are connected by a lead 20 to a light emitting diode 22 which will be described in more detail hereinafter.

Preferably, the battery assembly 16 is raised off of the bottom surface 24 of the container 10 so as to prevent battery corrosion. Small posts or the like 26 may be used to so position the battery assembly.

Attached to the underside of the container 10, which is a flotation device, is a plastic collar 28 which is fastened by screws or the like 30 to the bottom of the container. The collar 28 may be internally threaded, as at 32, to mount the upper section 34 of a walled enclosure indicated generally at 36. The upper section 34 of the enclosure 36 may be threadedly attached to the collar 28, although the invention should not be so limited.

A lower section 38 of the enclosure 36 may be fastened to the upper section 34 by bolts 40 positioned within a plastic sleeve 42 so that the two sections of the enclosure define a circumferential entrance space or opening 44 for the passage of mosquito larvae into the walled enclosure 36.

Adjacent the bottom of the lower section 38 of the enclosure 36 is a flange 46 which is directly adjacent a threaded area 48. Attached to the threaded area 48 is a collection device 50, illustrated particularly in FIG. 3. The device 50, which may be plastic, as are the majority of the components disclosed herein, may have a downwardly extending circumferential wall 52 having a groove 54 within which is mounted a screen 56. The collection device 50 is removable, thus the bottom opening 58 of the enclosure 36 may be opened, as illustrated in FIG. 2, or it may be closed by the screen 56, as illustrated in FIG. 1.

The light emitting diode 22 is connected by leads 20 to the batteries 18, with the wires passing downwardly through a sleeve 62. The light emitting diode is preferably of the type which provides generally equal light in all radial directions, rather than a beam of light in an axial direction. It is common in the art to describe such an LED as a tombstone or a spherical total light diffuser. Thus, the light will be directed throughout the 360° circumferential extent of the opening 44 to attract mosquito larvae from all directions.

In use, the container 10 will be placed upon a body of water and the weight of the container plus that of the battery package therein will cause the container to sink down into the body of water such that water completely fills the interior of the enclosure 36. The container should be so positioned initially within the water that there is no potential for trapping air at the top of the enclosure 36, as it is necessary that the enclosure be without air so as to provide a means for destroying any larvae which swim into it. The larvae are attracted by light, as they periodically require air to sustain life and associate light with the surface of a body of water where air is present. Thus, the larvae will swim through the circumferential opening 44 into the enclosure and will swim upwardly toward the top of the enclosure. However, since there is no air and no way out, the larvae will normally expire within a very short period of time. The larvae which have thus died will either float downwardly through the open bottom, in the FIG. 2 use of the invention, and be a part of the food chain within the pond or body of water where the container 10 is located; or if the collection screen assembly 50 is used, the larvae will be collected on the screen, which will provide an indication of the larvae population within the body of water.

The invention uses batteries as the power source. Normally, there will also be a day/night timer or cutoff switch associated with the batteries as the mosquito control device disclosed herein will normally only be used at night where the light will provide the attraction means in an otherwise dark environment. Although the invention shows batteries as the sole power source, it may also be within the scope of the invention to provide a solar powered source to recharge the batteries during the day. Thus, with a day/night timer and a solar cell to charge the batteries, the control device may have an essentially infinite life when placed within a body of water.

Of particular advantage is the dual use of the device as both a control means and a collection means. Also important is the use of a 360° essentially circumferential opening so that larvae may be attracted from any direction to the light trap.

Whereas the preferred form of the invention has been shown and described herein, it should be realized that there may be many modifications, substitutions and alterations thereto.

The embodiments of the invention in which an exclusive property or privilege is claimed are defined as follows:

1. A device for the control of mosquito larvae including flotation means, a self-contained electrical power source associated with said flotation means, a light source extending downwardly from said flotation means and connected to said power source for activation thereof, a walled enclosure depending from said flotation means and having an upper portion and a lower portion axially spaced therefrom, which enclosure will be filled with water when said flotation means is placed upon the surface of a body of water, the space between said enclosure portions forming an opening generally 360° in circumferential extent in said walled enclosure for the passage of mosquito larvae into said enclosure when attracted by light from said source, said opening being located generally adjacent said light source, mosquito larvae attracted by light from said light source will swim into said enclosure through said opening and then upwardly within said enclosure seeking air and will shortly expire due to the lack of air within said enclosure.

2. The device of claim 1 wherein said flotation means includes a container having a chamber, the self-contained electrical power source including at least one battery positioned within said container.

3. The device of claim 2 wherein said container has a bottom surface, and means raising said at least one battery above said lower surface to prevent corrosion thereof.

4. The device of claim 1 wherein said light source includes a light emitting diode.

5. The device of claim 4 wherein said light emitting diode is positioned generally in alignment with said enclosure opening.

6. The device of claim 1 wherein said enclosure has a bottom opening whereby mosquito larvae which have expired within said enclosure will fall downwardly through said opening into the body of water.

7. The device of claim 1 wherein said enclosure has a bottom opening and includes collection means mounted to said bottom opening which will collect mosquito larvae which have expired within the enclosure.

8. The device of claim 7 wherein said collection means includes a screen.

* * * * *